United States Patent [19]

Fassauer

[11] Patent Number: 5,483,788
[45] Date of Patent: Jan. 16, 1996

[54] CUTTING APPARATUS MULCH RECYCLE SYSTEM

[76] Inventor: Arthur L. Fassauer, 420 Foster La., Canyon, Tex. 79015

[21] Appl. No.: 396,276

[22] Filed: Feb. 28, 1995

Related U.S. Application Data

[63] Continuation of Ser. No. 86,347, Jun. 29, 1993, which is a continuation-in-part of Ser. No. 857,766, Mar. 26, 1992, Pat. No. 5,205,113, which is a continuation-in-part of Ser. No. 528,718, May 24, 1990, Pat. No. 5,101,615.

[51] Int. Cl.⁶ .................................................. A01D 53/00
[52] U.S. Cl. .............................................. 56/12.1; 56/12.8
[58] Field of Search ........................... 56/12.1, 12.7–12.9, 56/13.4–13.6

[56] References Cited

U.S. PATENT DOCUMENTS

| | | | |
|---|---|---|---|
| 2,754,809 | 7/1956 | Hainke | 56/12.8 X |
| 5,048,275 | 9/1991 | Fassauer | 56/12.8 |
| 5,101,615 | 4/1992 | Fassauer | 56/12.8 |
| 5,222,349 | 6/1993 | Fassauer | 56/12.8 |
| 5,224,326 | 7/1993 | Dunn | 56/17.1 X |

*Primary Examiner*—Michael Powell Buiz
*Attorney, Agent, or Firm*—Gregory M. Howison

[57] ABSTRACT

The present invention describes an air-floated wheeled apparatus with plurality of wheels having a deck housing, an outer house shroud for vacuum and pressure device, to define a mulch system having pressure and vacuum chambers in the main deck housing as well as a pressure chamber in the outer shrouds, and a vacuum chamber in the aft portion of the outer shroud or vacuum device that provides an aft clean up of mode area beyond the width of blade. A drive mechanism includes a motor having a rotatable shaft with at least 1 impeller is supported in the pressure chamber and rotates on a shaft for exhausting air from the vacuum chamber to erect grass underlying an opening while simultaneously pressurizing air in the pressure chamber to float the apparatus in combination with wheels that supports maximum weight of apparatus as well as a frontal wheel support or ball lake wheel support for directional support and maneuverability thereto. The cutting disc includes multiple blades, retractable and swivel blades for cutting the grass.

20 Claims, 8 Drawing Sheets

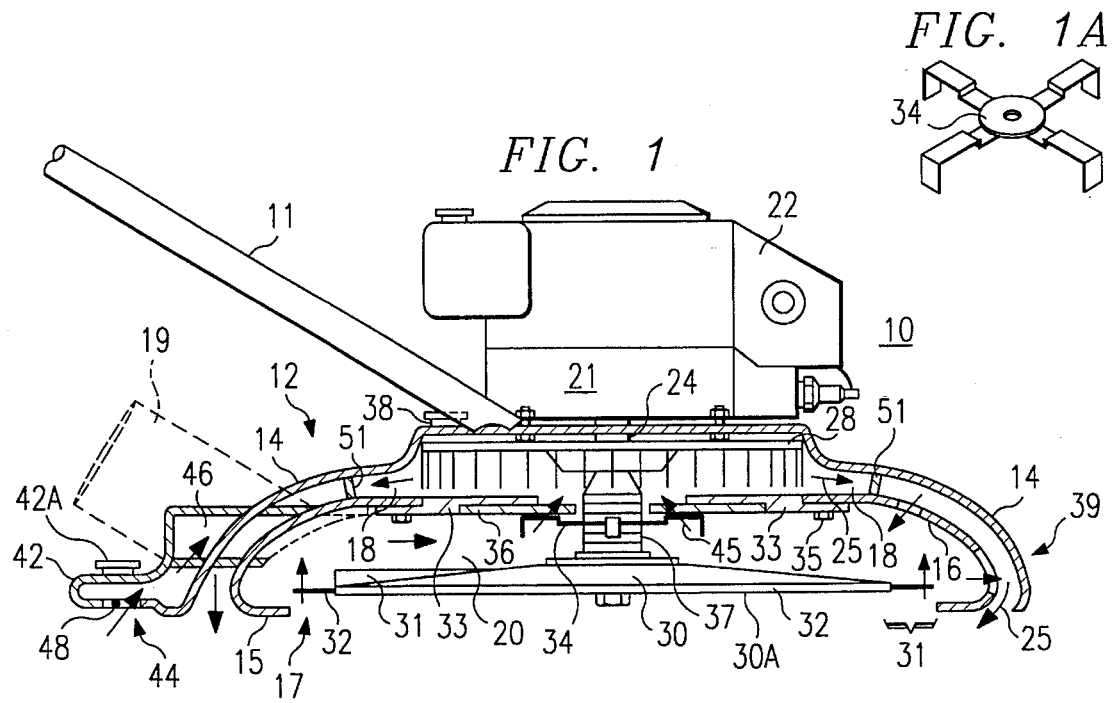
FIG. 1A
FIG. 1
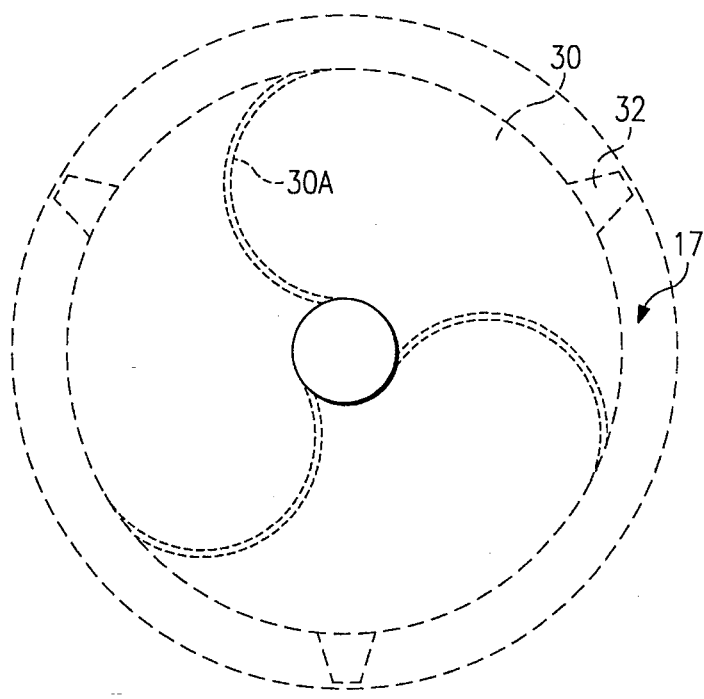
FIG. 1B

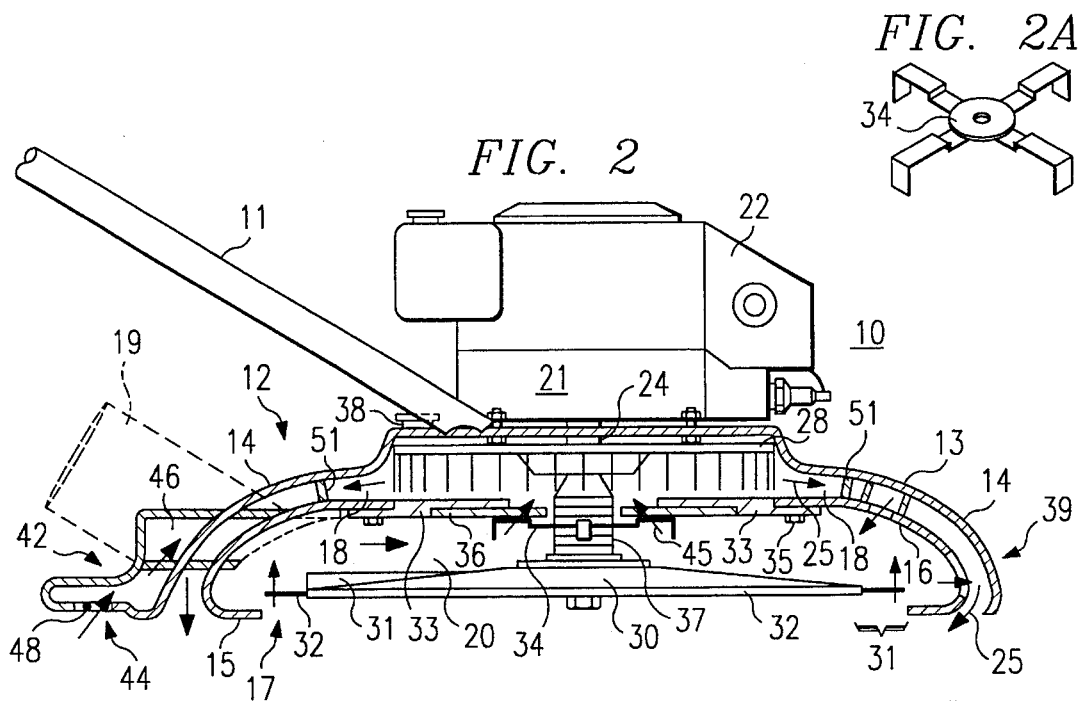
FIG. 2
FIG. 2A
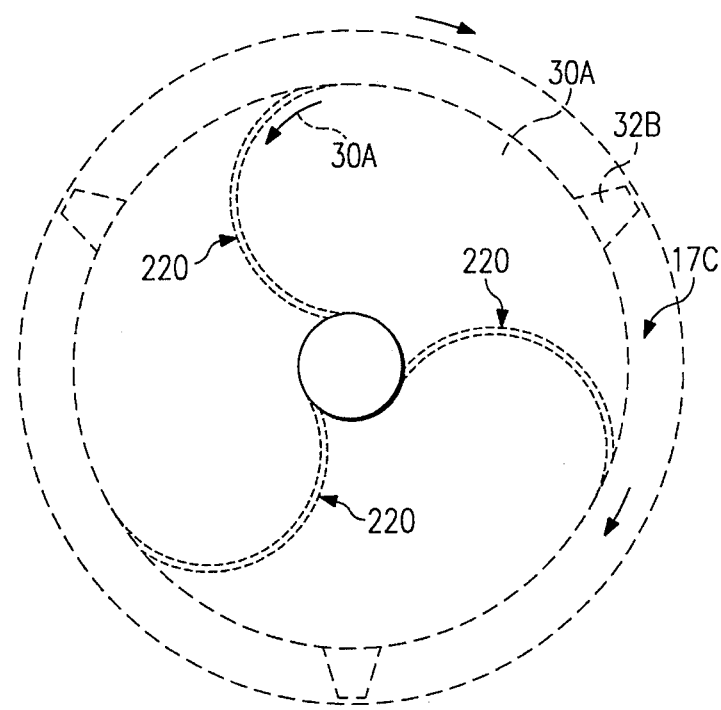
FIG. 2B

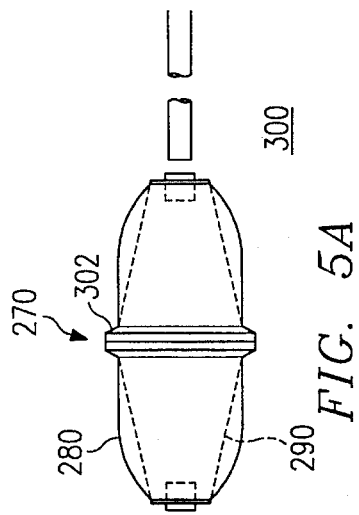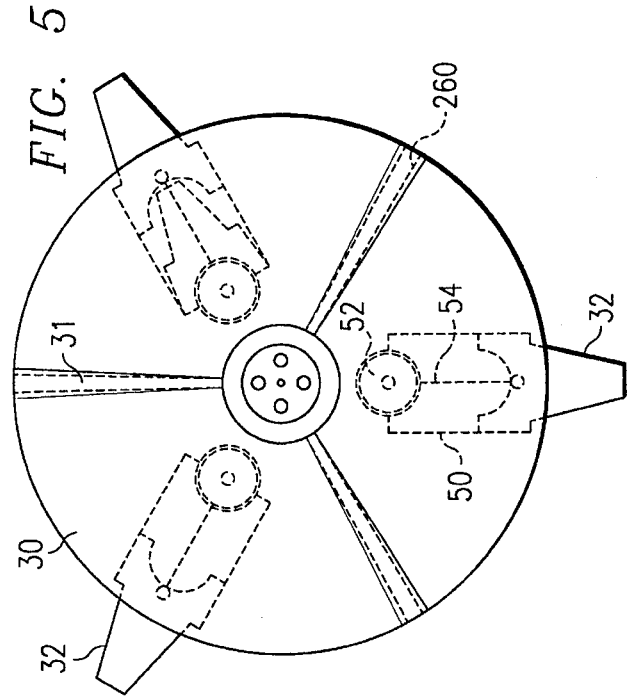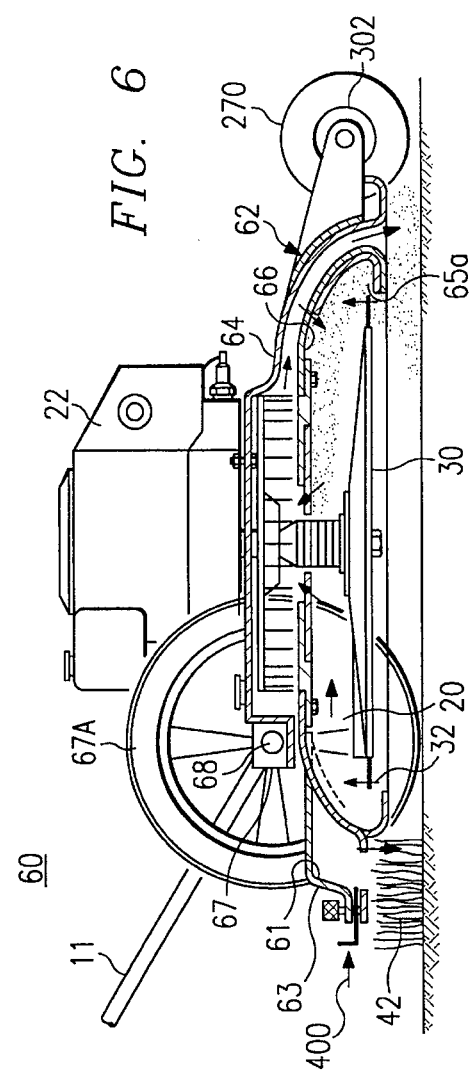

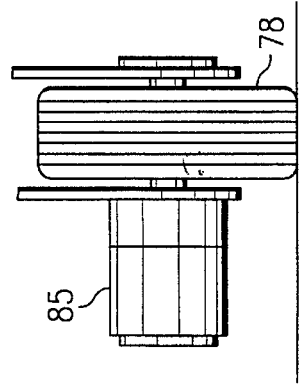
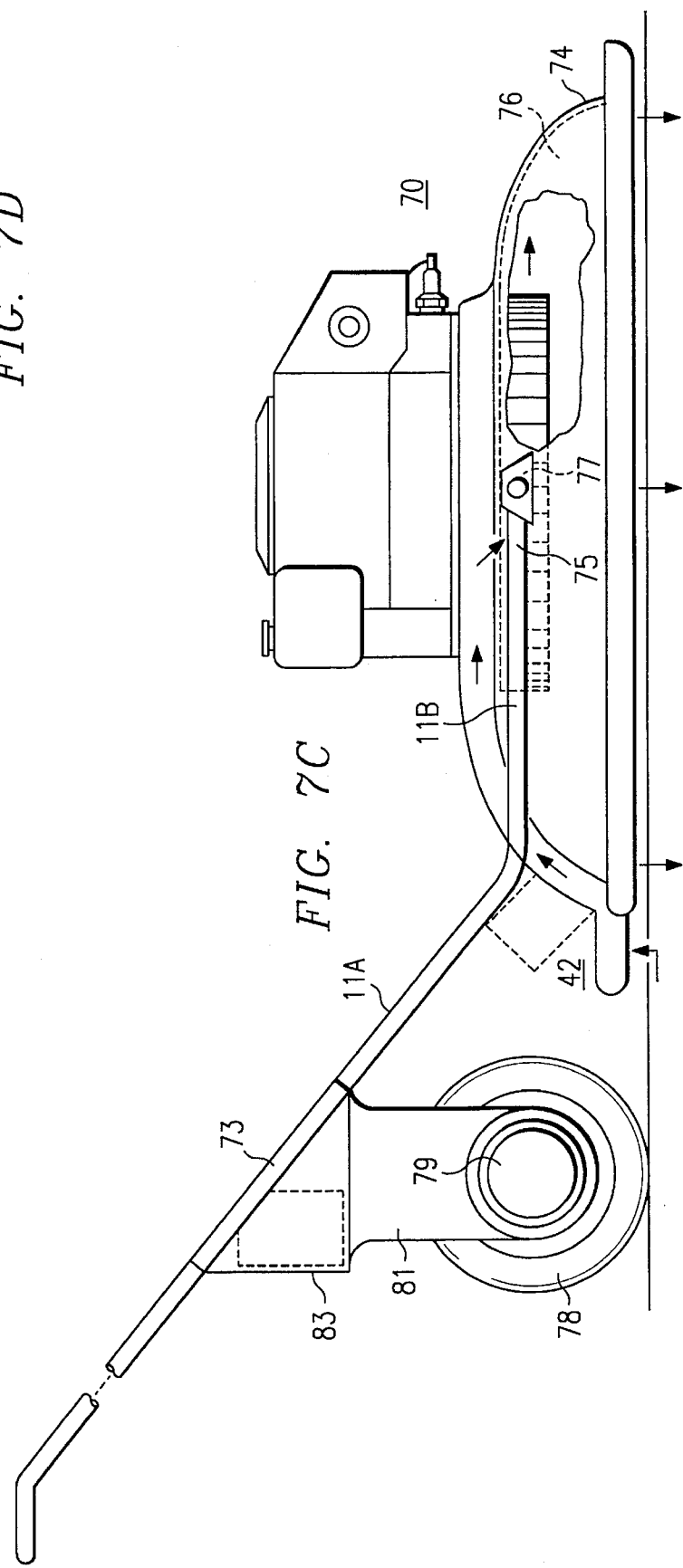

CUTTING APPARATUS MULCH RECYCLE SYSTEM

CROSS-REFERENCE TO RELATED APPLICATION

This application is a Continuation of application Ser. No. 08/086,347, filed Jun. 29, 1993, which is a continuation-in-part of prior application Ser. No. 07/857,766 filed Mar. 26, 1992, now U.S. Pat. No. 5,205,113, issued on Jun. 29, 1993, which is a continuation-in-part of Ser. No. 07/528,718, filed May 24, 1990, now U.S. Pat. No. 5,101,615.

TECHNICAL FIELD

The present invention relates generally to an air-floated apparatus, such as a lawn mower, that floats on an air cushion during operation and that includes an inverted impeller, a vacuum module and a retractable blade mechanism that together cooperate to provide enhanced operation over conventional lawn mowers and other hover-type devices. The apparatus may also include an auxiliary drive mechanism such as a self-propelled drive wheel or wheeled platform whose level is adjustable relative to the main housing of an air-floated apparatus. The apparatus may also be understood to constitute a centrifugal means in a single chamber (See FIGS. 7, 7A and 7B) of an air-floated single deck housing. Power may be produced and transmitted by a flexible coupling (FIG. 7) or a horizontal V-belt and pulleys (FIG. 6) whereby the motor is mounted with its weight over the central pivot point of the wheel or wheels mounted aft for forward flotation, allowing the forward flotation of the deck, thus reducing the flotation weight of said deck. Wheel rollers, cones or a support roller ball may be employed to provide directional guidance means when the unit is taken out of storage to the lawn area. A spinning cutting disc may also be included to produce a secondary support of the deck housing whereby the spinning disc is below the grass cutting means may be utilized.

The present invention also relates generally to cutting apparatus, such as lawn mowers and the like, and more particularly to cutting apparatus in which cuttings are recut and recycled for mulching.

Mulching of cut grass and other vegetation has significant ecological benefits. Heretofore, it has not been possible to effectively mulch grass clippings and the like with conventional lawn mowers for several reasons, including the problem of clippings falling to the ground beneath the blade after the initial cut. It would therefore be desirable to provide a lawn mower with an improved mulching capability, whereby pressure and vacuum energy forces are produced by impeller means.

BACKGROUND OF THE INVENTION

It is known in the prior art to provide an air-supported or "hover" apparatus. Generally, such devices include a substantially-enclosed housing and means for generating air pressure within the housing to provide an air cushion to float the housing over a support surface. Examples of such devices are shown in U.S. Pat. Nos. 3,170,276, 3,293,836 and 4,245,455, and U.K. Patent Specification No. 1,534,021.

While air-floated devices of the prior art have significant advantages over conventional wheeled products, such devices have certain inherent problems which have yet to be overcome. In particular, such devices typically include an outer housing having a narrow peripheral edge, bezel or seal. During operation, air blown toward the ground by the air pressure means tends to escape from the housing between the ground and the narrow edge structure, which substantially reduces the lifting force on the housing. The rapid escape of air along the periphery of the mower housing also stirs up dust and debris when mowing around shrubbery and the like, which makes mowing difficult and hazardous. Also, because the air is blown downward to keep the housing afloat, the air pressure depresses the grass, causing the cutting blade to leave an uneven cut. Other problems include the inability to maintain lateral or side-to-side stability of the device.

Another disadvantage of prior art air-cushioned mowers is their inability to discharge grass cuttings, which leaves a windrow of cuttings that must be raked up after mowing. Conventional lawn mowers tend to vacuum up grass by the rotary action of the cutting blade. In prior art air-cushioned mowers, however, downwardly blown air pressure used to cream the lifting force by ground effect is not sufficient to effectively discharge grass cuttings. In other words, prior art air-cushioned mowers have not been able to maintain adequate flotation while simultaneously discharging grass clippings from a port.

It is known in the prior art to provide a hover-type apparatus in which air is recycled by the suction side of the impeller used to float the housing. One such system is shown in FIG. 5 of U.S. Pat. No. 4,738,086 to Dunn. A similar teaching is shown in FIG. 2 of U.S. Pat. No. 4,316,001 to Almond, et al. While such systems have some advantages, they do not solve the above-identified problems. Moreover, these systems teach only recycling of air; the clippings themselves are not recycled.

It would therefore be desirable to provide an improved air-floated apparatus that over comes these and other problems associated with the prior art.

BRIEF SUMMARY OF THE INVENTION

It is an object of the present invention to provide an air-floated apparatus, such as a lawn mower, that floats on an air cushion during operation.

It is still a further object of the invention to describe an air-floated apparatus that is simple to construct, has few moving parts and which is easy to maintain.

It is an object of the invention to provide an air-floated apparatus that includes an impeller supported in a novel manner to simultaneously float the apparatus and to create a partial vacuum chamber for standing grass underlying the apparatus prior to cutting.

It is still another object of the invention to provide an air-floated apparatus that has improved stability and gliding maneuverability, and guidance thereto in combination with wheel or wheels mounted aft of center line of cutting means.

It is yet a further object to provide an improved "hover" apparatus which includes an inverted impeller, a vacuum module and a retractable blade mechanism that together cooperate to provide enhanced operation over conventional lawn mowers and other hover-type devices. The apparatus may also include an auxiliary drive mechanism such as a self-propelled drive wheel or wheeled platform whose level is adjustable relative to the main housing of the air-floated apparatus.

It is another object of the invention to provide an air-cushioned lawn mower in which the channeling of air pressure for flotation is separated from the cutting of grass to facilitate efficient transport of grass clipping for mulching.

It is a still further object of the invention to provide an air-cushioned lawn mower for use in mulching grass clippings.

It is another object to provide a hover-type lawn mower that includes a vacuum module for use in vacuuming and recycling grass cuttings to generate ultrafine cuttings which are then blown back into the ground throughout a predetermined radial area of the mower housing up to 360 degrees. The amount of vacuum generated by the vacuum module is readily adjustable by an adjustable air intake mechanism.

A further object of the present invention is to provide centrifugal means in a single deck housing chamber (See FIGS. 7, 7A and 7B).

An additional object is to provide power from and a substantial portion of the weight on an over the center line of the central pivot point of a wheel or wheels.

Additionally the objects of the present invention may be facilitated by the use of rollers including specially designed rollers of conic sections and in the form of balls with and without treads thereon to provide a fluidlike turning radius.

Additional objects may be obtained by the provision of an invertible impeller so as to provide for increased or decreased pressure at predetermined points with a single chamber.

An additional object may be achieved by the use of power transmission means including flexible coupling as the power means are associated with the wheel, roller or ball bearing means as hereinafter described.

An additional group of objects may be achieved by the use of spinning disc cutting means which may additionally include means to produce secondary support thereof.

Further, in accordance with the present invention, a cutting apparatus is provided having a substantially endless housing with an open bottom, an air intake opening and discharge port; projection means projecting inwardly from a bottom part of the housing; rotatable cutting means mounted in the housing; and recycle means attached to the discharge port for receiving cuttings produced by the rotatable cutting means and delivering the cuttings to a predetermined location adjacent the housing for mulching (See, 7, 7A and 7B) with the impeller with vacuum pressure side up. The housing cooperates with the projection means to define a substantially enclosed centrifuge chamber. In one embodiment, the recycle means includes applicator means for treating the cuttings to facilitate composting and fermentation thereof following delivery to the ground beneath the apparatus.

In accordance with a unique feature of the invention, the apparatus includes pressurizing means for pressurizing air in the housing. The increased pressure in the housing enhances the centrifugal movement of the cuttings within the housing. The projection means also enhances the air pressure within the housing by directing air inwardly within the housing, to inhibit the escape of air therefrom. In one embodiment, the projection means comprises a relatively inward plate member, which provides a support shelf for the centrifuged cuttings. The plate member cooperates with an inner wall of the housing to channel the cuttings to the discharge port. In another embodiment, the plate member includes diverter means for diverting at least some of the cuttings inwardly toward the cutting means for finer cutting. Increased air pressure within the housing provided by the pressurizing means and the projection means not only enhances the delivery of cuttings to the discharge port, but also enhances the application of the cuttings to the soil through the discharge port under pressure (See 7, 7A and 7B).

In accordance with another feature of the invention, the cutting apparatus includes a plurality of rotatable wheels for supporting the housing. The apparatus is advanced in a forward direction by the rotational movement of the wheels. In another embodiment, a plurality of rotatable roller cone members are provided for secondary support of the housing.

In accordance with yet another feature of the invention, the apparatus includes an aft vacuum module means operably coupled to a vacuum side of the pressurizing means for vacuuming cuttings that are not delivered to the support surface by the recycle means. The dedicated centrifuge chamber formed by the housing and projection means facilitates transport of the cuttings to and through the discharge port to the mulch recycle means for application of the cuttings to the soil.

The mulch recycle system according to the present invention is applicable for use in various types of lawn mowers, including wheel-supported lawn mowers and air-floated lawn mowers. The mulch recycle system is preferably located on a front portion of the lawn mower to locate the discharged cuttings in the path of the advancing lawn mower blade for further cutting.

These and other objects of the invention are provided in an air-floated apparatus comprising a housing having an outer shroud, the outer shroud surrounding a predetermined portion of the housing to define a pressure chamber and a vacuum chamber within. A drive mechanism includes a motor having a rotatable shaft. An impeller may be supported in an inverted manner in the pressure chamber such that its vacuum side faces downward into the vacuum chamber. The impeller rotates on the shaft for exhausting air from the vacuum chamber to erect grass underlying the opening while simultaneously pressurizing air in the pressure chamber to float the apparatus above the grass. The apparatus further includes a spinning, cutting disc rotatable on the shaft and supported in a bottom opening to substantially enclose the vacuum chamber. The cutting disc may include multiple retractable blades for cutting the grass.

The apparatus preferable includes a vacuum module attached to or integrally formed with the shroud. The vacuum module includes a vacuum slot which is coupled to the vacuum chamber to suction grass clippings into the slot. The grass clippings are suctioned or "vacuumed" to and through the vacuum chamber into the vacuum side of the impeller and then to and through the pressure chamber where they are then driven back into the ground by the pressurized air. Preferably, the vacuum module further includes an agitator supported in the vacuum slot for stirring grass debris to enhance suctioning.

According to other features of the invention, the cutting blades of the cutting disc are retractable, with each blade being in a first retracted position when the cutting disc is at rest or idling at low speed and a second extended position when the cutting disc is rotated on the shaft. The cutting disc itself enhances the hovering operation by substantially enclosing the vacuum chamber (except for a small circular section in which the extended cutting blades rotate). The cutting disk preferably includes one or more vertical molded extensions on the bottom of the disk for disturbing the cut grass clippings following cutting. Optionally, a dicing module is supported on the motor shaft and selectively positioned adjacent one or more fixed dicing blades located between the pressure and vacuum chambers. After the grass is initially cut by the retractable blades of the cutting disc, these cuttings are airborne and are drawn into the pressure chamber by the vacuum stream within the vacuum chamber. As the cuttings pass between the vacuum chamber and the vacuum side of the impeller (and thus into the pressure chamber), they are cut again into more fine cuttings by the dicing module and the fixed dicing blades.

The structure of the cutting disk facilitates the maintenance of a partial vacuum in the vacuum chamber sufficient to erect the underlying grass for cutting by the extensible blades and to suction grass debris into the vacuum slot. The actual amount of vacuum is selectively controlled by an adjustable air intake valve at the aft vacuum clean up module that delivers intake air if necessary into the vacuum chamber, for control of maximum clean up.

According to another significant feature of the invention, the air-floated apparatus includes an auxiliary drive mechanism such as one or more self-propelled drive wheels or a stand-on or tractor-type wheeled platform. In these embodiments, the air-floated apparatus includes the above-described vacuum module but the air cushion used to float the apparatus is generally directed throughout a predetermined frontal area of the housing (when the wheels are rear-mounted). A manual or automatic adjustment means is also provided for presetting the relative levels of the platform and the housing to adjust the depth of cut. By dynamically varying the impeller speed (which determines the level of the airfloat frontal portion of the housing), the operator can thus match the preset position of the mower deck housing and is also maximized by mounting motor and motor weight aft on CL of aft wheels.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a sectional view of an air-floated apparatus according to the present invention;

FIG. 1A is a perspective view of the mulching module;

FIG. 2 is a plan view of the extended vertical molded extension on the bottom of the cutting disc which is V-shaped;

FIG. 3 is a sectional view of a further embodiment of an air-floated apparatus according to the present invention;

FIG. 3A is a perspective of the mulching module in association with FIG. 3;

FIG. 4 is a plan view of a cutting disc in accordance with one embodiment of the present invention;

FIG. 4A is a sectional view of a cutting disc in accordance with and as shown in FIG. 4, which is a smaller diameter, as shown in FIG. 4;

FIG. 5 is a plan view of the preferred cutting disc for use in the apparatus;

FIG. 5A is a partial sectional representation of a roller or roller cone in accordance with the present invention;

FIG. 6 is a side view, partially cutaway, of a first alternate embodiment of the invention wherein the air-floated apparatus includes an auxiliary drive wheel and front support conical roller (FIG. 5A);

FIG. 7B is a back view of a DC drive rotor self-propelled module;

FIG. 7C is a side view of an air pressure chamber full floatation;

Similar reference characters refer to similar parts throughout the several views of the drawings,

DETAILED DESCRIPTION

Figure 7:
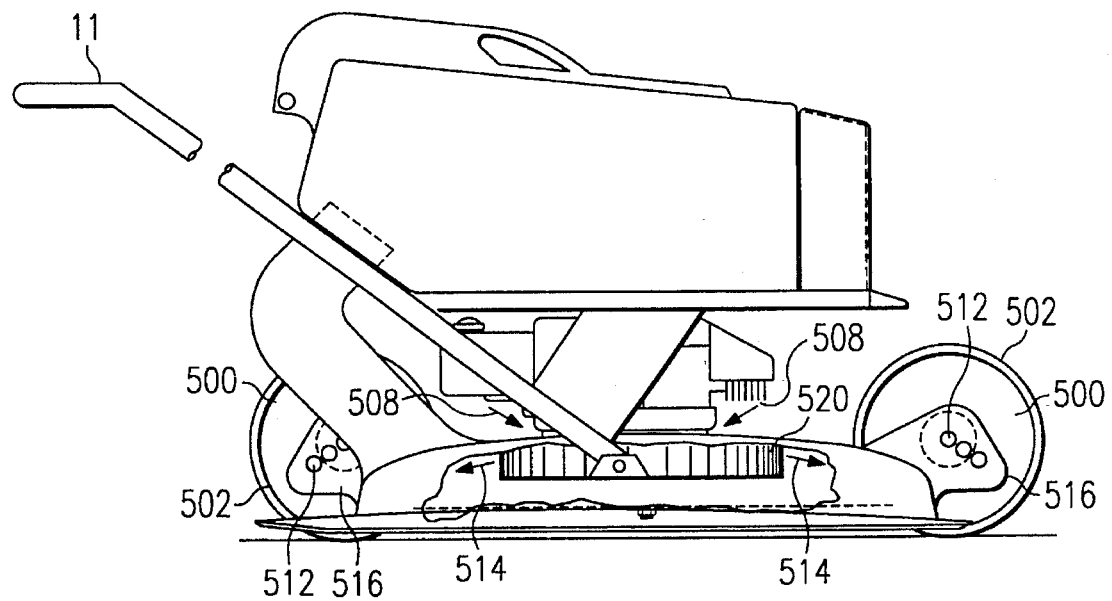
FIG. 7 is a side view of yet a further embodiment of the present invention employing roller balls.

Referring now to FIG. 1, a cutaway sectional view, is shown of an air-floated apparatus 10 for use as a full floatation lawn mower. Air-floated apparatus 10 includes a housing 12 having an outer shroud 14 and an inner shroud 16, the outer shroud 14 substantially surrounding the inner shroud 16 to define a (substantially 360 degrees) pressure chamber 10 between the inner and outer shrouds and a vacuum chamber 20 within the inner shroud. The outer shroud supports the inner shroud using a plurality of radically-positioned structural members 51. The inner shroud includes a bottom opening 17 defined by an inner periphery of an integral plate member 15. The opening 17 is preferably circular as best seen in FIG. 2. Each of the shrouds is generally square or trapezoidal in shape and preferably made of plastic material formed by an injection molding process to provide a lightweight housing. An air intake and balance assembly 13 is supported in the vacuum chamber 20. The air intake includes an adjustment valve 42A (such as a threaded cap) that selectively adjusts the amount of intake air drawn into the aft vacuum cleaner module 42. The air intake is generally closed because sufficient air underlying the housing can be drawn into the vacuum chamber. If additional air or a balancing of the vacuum and pressure is needed, the air intake is adjusted with valve 4 of the vacuum cleanup module 42. A conventional handle 11 is secured to the housing in the normal fashion.

The apparatus includes a drive mechanism 21 that includes a motor 22 having a rotatable shaft 24. The motor 22 can be an AC or DC electric motor or, alternatively, a conventional lawn mower gasoline engine. A single impeller 28 is supported in an inverted or "upside-down" manner in the pressure chamber 18 and rigidly secured to the shaft 24. The impeller 28 is preferably comprised of lightweight plastic material and may be formed by injection molding. The impeller rotates on the shaft 24 for drawing intake air from below the housing (and, if necessary, through the air intake 13) and exhausting such air from the vacuum chamber 20 to create a partial vacuum in the chamber 20 sufficient to erect grass underlying the opening 17. Simultaneously, the air is pressurized in the pressure chamber 18 and driven into the ground about a substantially 360 degrees periphery of the housing to float the apparatus above the grass. This primary air flow is evidenced by the arrows 25. The impeller 28 has a greater than normal height and thus surface area because a large mass of air must be pressurized in order to float the housing while simultaneously creating the partial vacuum in the inner shroud. Rather than an outward extended flange, an alternate possibility is to have an inward radius on the bottom of the frontal shroud, with extreme pressures extending the rage inward and downward under the centrifugal shelf to maximize lift under the shelf.

The apparatus further includes a cutting disc 30 rotatable on the shaft and supported in a bottom opening 17 of the inner shroud to substantially enclose the vacuum chamber 20 except for a small circular region 31. The cutting disc includes at least blade 32 for cutting the grass.

The cutting disc 30 preferably also includes one or more vertical molded extensions on bottom of cutting disc (V-shaped as shown) 30A (or other suitable air disturbance means) for disturbing the cut grass clippings following cutting to ground level. Optionally, a mulching module 34 is supported on the motor shaft between a pair of spacers 37 and selectively positioned adjacent one or more fixed blades 36 located between the pressure and vacuum chambers. The blades are affixed to first and second support plates 33 that are removably secured to the inner shroud by fasteners 35. After the grass is initially cut by the retractable blades of the cutting disc, these cuttings are drawn into the pressure chamber by the vacuum stream created by the vacuum side of the impeller. As the cuttings pass between the vacuum chamber and the pressure chamber, they are cut again into more fine cuttings by the mulching module 34 and the fixed blades 36. FIG. 1A shows the preferred construction of the mulching module 34.

Upon loosening of the fasteners 35, the support plates 33 are removed to facilitate removal of the impeller for service and cleaning. As an alternative, a clean-out assembly 38 is provided. The assembly includes a removable threaded cap 38 to enable a water hose to be placed into or threaded to the assembly. Water is then directed into and forced through the pressure chamber to effect a cleaning of this chamber. Such cleaning is effected even while the impeller is rotating.

A discharge duct 19 is available but is sealed when the impeller is in the inverted position shown; if the invertor is turned upright (vacuum side up), the pressure chamber becomes the vacuum chamber and vice versa. In such configuration, the discharge duct 19 is open (or connected to a grass catching receptacle) for discharging clippings. Thus the same mower elements are suitable for both types of designs.

Referring now simultaneously to FIGS. 1 and 2, the apparatus also preferably includes a vacuum module means 42 supported along or integrally formed in a rear portion of the outer shroud 14 for vacuuming grass debris. The vacuum module 42 includes a longitudinally-extending vacuum slot 44 that is coupled to the vacuum chamber 20 through a pair of ducts (or other slot-like transition) 46. The vacuum created by the impeller 28 is used to create a suction force along the extent of the vacuum slot 44. The vacuum module is primarily designed to suction "fine" clippings and the like that are the by-products of grass previously cut but not forced into the ground. These fine cuttings are then recycled through the apparatus by being drawn into the vacuum chamber 20 and then delivered into the pressure chamber 18 where they are then driven back into the ground by the pressurized air or are recut as the mower is advanced. The recycling of the clippings is shown by the arrows 45 and this operation produces ultrafine mulched cuttings (when the discharge duct 19 is sealed). If grass discharge duct 19 is open to grass catching means, a controllable ratio of mulch to grass catching can be obtained.

To enhance the suctioning effect, the vacuum module means 42 further includes an agitator wire 48 supported in the vacuum slot for stirring up grass debris. The wire 48 is preferably a nylon filament. Moreover, the air intake and balance control 13 is shown for convenience in FIG. 1 in the frontal area 39 of the housing. However, this intake may be desirably located adjacent the vacuum module 42 to enhance the operation.

Referring now simultaneously to FIGS. 2 and 5, the cutting disc 30 includes at least one and preferably three retractable cutting blades 32 symmetrically positioned on the cutting disc. The cutting disc supports each of the retractable blades in a slot 50. One end of each slot 50 includes a rotatable spring-recoil spool 52 to which the blade 32 is attached via a cord 54 adapted to be wrapped around the spool 52. Each blade 32 of the cutting disc is thus retractable, the blade being in a first retracted position (with the cord 54 wrapped around the spool 52 as shown in phantom) when the cutting disc is at rest or idling at low speed and a second extended position (with the cord extended from the spool) when the cutting disc is rotated on the motor shaft 24 (FIG. 1). The extended position is shown in FIG. 5. This drawing also shows the relative positions of the vertical molded extensions 31 on the bottom of the cutting disc for disturbing the cut grass clippings following cutting as described above. Other air disturbing or fan-like structures may be used. If desired, the blades can be positioned in a stepped arrangement.

FIG. 6 is a side view, partially cutaway, of a first alternate embodiment of the invention wherein the air-floated apparatus 60 includes an auxiliary drive assembly. In this embodiment, the housing 62 has an outer shroud 64 and the inner shroud 66. The outer shroud 64 surrounds a radial portion (approximately 140 degrees) of the inner shroud along the frontal area 62 of the housing such that the pressure chamber directs the air cushion throughout this predetermined area as opposed to around the substantially 360 degrees area (between the inner and outer shrouds 66 and 64) as described above with respect to FIG. 1. The apparatus also includes the vacuum chamber 20 and the cutting disc 30, however, in this embodiment the vacuum module 42 is formed by the rearwardly-extending platform 61 and the vertical wall 63 which extends downwardly from the platform 61. The vacuum module 42 communicates with the vacuum chamber 20 via a slot 65 in the inner shroud 66. The slot 65 replaces the ducts 46 of FIG. 1. The handle 11 is attached to the pivot assembly 67.

The drive wheel 674 is journaled on axle 68. The drive wheel may be powered with a suitable or D.C. variable-speed motor to enable the apparatus to be self-propelled.

Figure 8:
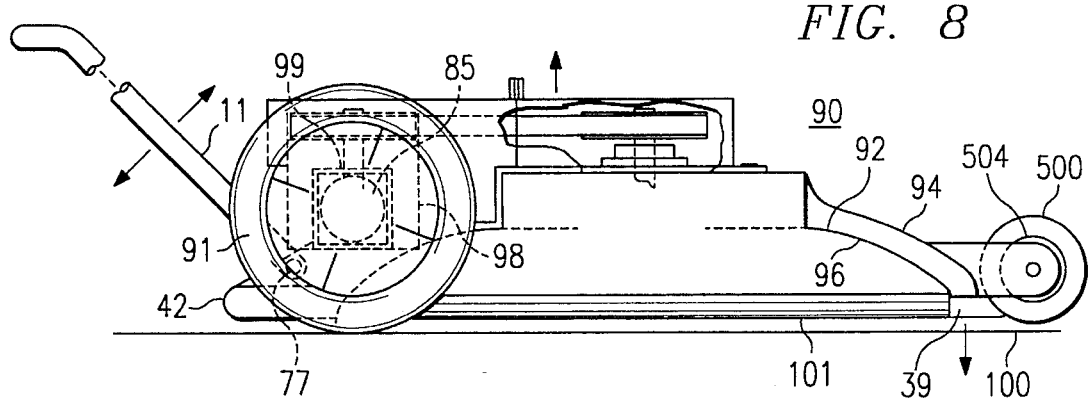
FIG. 8 is a side view of an alternate embodiment of the mower of the present invention wherein the handle of the mower includes an auxiliary drive mechanism for enabling walk-behind self-propelled operation with the weight over the wheels (motor aft CL of wheels)

FIG. 8 is a side view of yet another alternate embodiment of the invention wherein the auxiliary wheel drive mechanism is supported on a platform. The air-floated apparatus 90/110 includes a pair of auxiliary drive wheels, one of which is shown by reference numeral 91 in FIG. 8. In this embodiment, the housing 92 has a frontal outer shroud 94 and the inner shroud 96. The frontal outer shroud 94 surrounds only a small radial portion of the inner shroud along the extreme frontal area 39 of the housing such that the pressure chamber directs the air cushion throughout this predetermined area as opposed to around the substantially 360 degree area. The apparatus also includes the vacuum chamber and the cutting disc (not shown); in this embodiment, the vacuum module is formed in the manner wherein an internal slot in the inner shroud enables the vacuum slot of the aft cleanup vacuum module 42 to communicate with the vacuum chamber within the inner shroud. The platform 98 supports the wheel-support frame assembly 99 that includes a wheel drive assembly D.C. motor 85 and suitable drive shaft as well as a vertical D.C. drive assembly motor 604 which drives a horizontal V-belt drive assembly 604A that drive the impeller and cutting blade assembly (not shown). The handle 11 is attached in rear-mounted pivot assembly.

Figure 9:
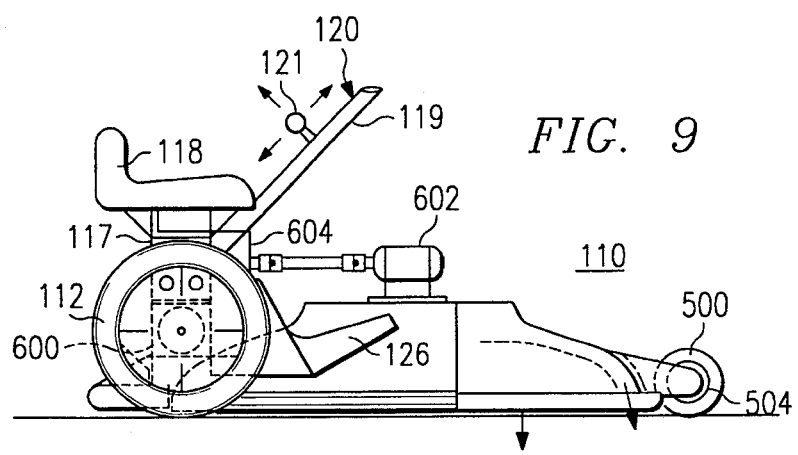
FIG. 9 is a further side view of another alternative embodiment of the present invention employing a flexible coupling and flexible shaft from motor to 90% transmission.
Figure 10:
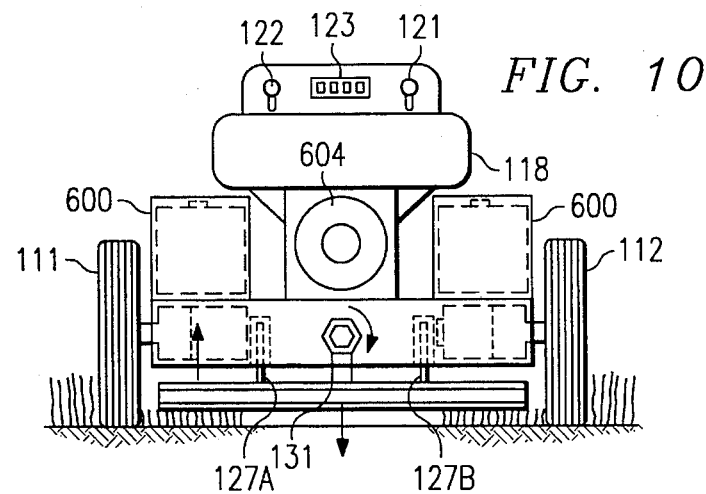
FIG. 10 is a back view of the auxiliary drive wheel assembly of the mower of FIG. 9.
Figure 11:
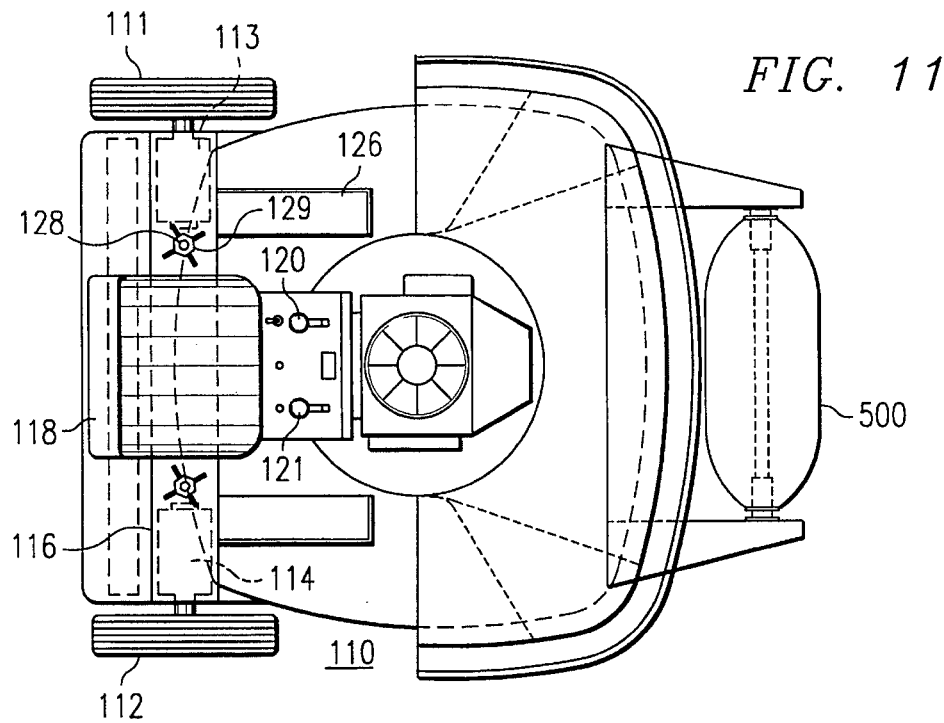
FIG. 11 is a plan view of yet another alternate embodiment of the invention wherein the auxiliary drive mechanism is supported on a platform instead of the mower handle and further utilizing front conical roller means (same as FIG. 5A)

FIG. 9 is a horizontal D.C. drive assembly motor 604 with a horizontal flexible coupling shaft couples to a 90° drive shaft assembly 602 that drives the impeller and cutting blade assembly (not shown), which allows the weight of the motor assembly to be carried over the center line of the wheel drive assembly. FIG. 9 further illustrates a side view of a tractor-type air-floated lawn mower according to the present invention. FIG. 10 is a back view of the apparatus of FIG. 9. The air-floated portion of FIGS. 9 and 10 is similar to the apparatus of FIG. 8 in that only a predetermined frontal portion Of the housing is floated through the use of an outer shroud covering a portion of the inner shroud in an air-tight manner. FIG. 11 shows the various different sizes (in phantom) of the outer shroud envisioned by the present invention; the 180 degree embodiment being preferred for the tractor-type mower. Although not shown in detail in FIG. 9, it should be appreciated that the previously-described vacuum chamber structure and retractable cutting disc assembly is also preferably used.

Referring now to FIG. 11, the tractor 110 includes a pair of auxiliary drive wheels 111 and 112, each of which is separately driven by a suitable drive motor. Drive motor 113 drives wheel 111 and drive motor 114 drives wheel 112. Two 12 volt deep cycle rechargeable batteries 600 (See FIGS. 9 and 10) or other suitable power supply (such as a polar-powered source) is used to power the motors 113 and 114. As best seen in FIG. 11, a frame member 116 supports the drive motors 113 and 114 and their associated axles. The batteries 600 are preferably supported in a seat support member 117 (FIG. 9) to which a padded seat 118 is affixed. The seat support member also supports an angled control panel member 119 which includes a control panel 120, a pair of individual joysticks 121 and 122, one for each wheel member, and a suitable digital or other display 123. The panel supports other control devices as necessary such as an electronic ignition and the throttle of the motor used to drive the hover apparatus and cutting blade. The panel member 119 is supported by the seat support member 117. Foot supports 126 are attached to the seat support member 117.

By individually controlling each wheel (through a separate joystick), the operator can rotate the mower in a full 360 degree turning radius.

As also seen in FIG. 10, the level of the mower housing is vertically-adjustable relative to the frame member. In particular, first and second support posts 127a and 127b are rigidly supported in the outer shroud (above the vacuum module) and are received in appropriate channels in the frame member. Each of the posts 127a and 127b assembly allows for depth adjustment and affixed by set screw and knob 131 and adjusted thereto.

The ability to adjust the position of the housing deck relative to the wheeled platform has significant advantages. The depth of cut is adjustable by presetting the vertical distance between the wheeled platform and the housing and then dynamically varying the impeller speed (which determines the level of the frontal portion of the housing by varying the mass of the pressurized air cushion). In the present invention, the wheeled assembly counteracts the downward vacuum force; at the same time, the forward portion of the housing is floated. In this manner, a larger mass of pressurized air is concentrated forwardly (or rearwardly if a forward wheel placement is used) to facilitate leveling of the housing using the throttle of the motor 604.

Figure 12:
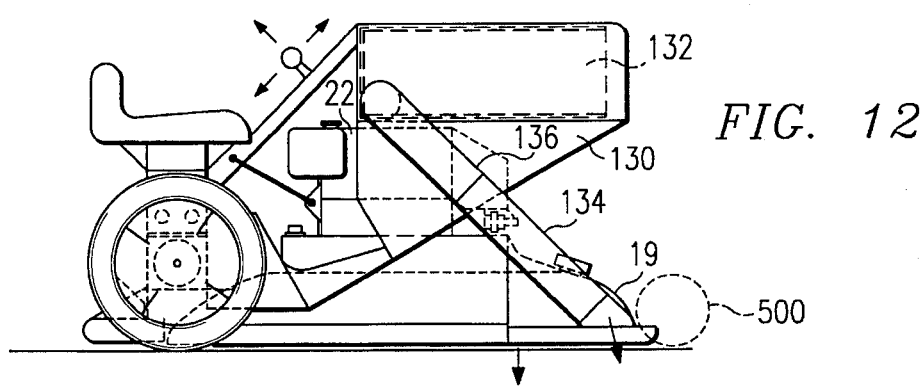
FIG. 12 is a side view of a modified tractor-type air-floated lawn mower which includes grass receptacle means and front roller means.

FIG. 12 is a side view of a modified tractor-type air-floated lawn mower which includes a main support structure 130 overlying the motor 22 for use in supporting a grass collection receptacle 132. In this embodiment, the impeller 28 is upright (with the vacuum side up) instead of inverted and the discharge duct 19 is used and forwardly-mounted. A pair of flexible sleeves 134 and 136 are used to deliver the cut grass clippings from the discharge duct to the receptacle 132. The sleeve 134 includes a distal end that is slidable within the sleeve 136 so that the sleeves are slidable relative to each other.

Figure 13:
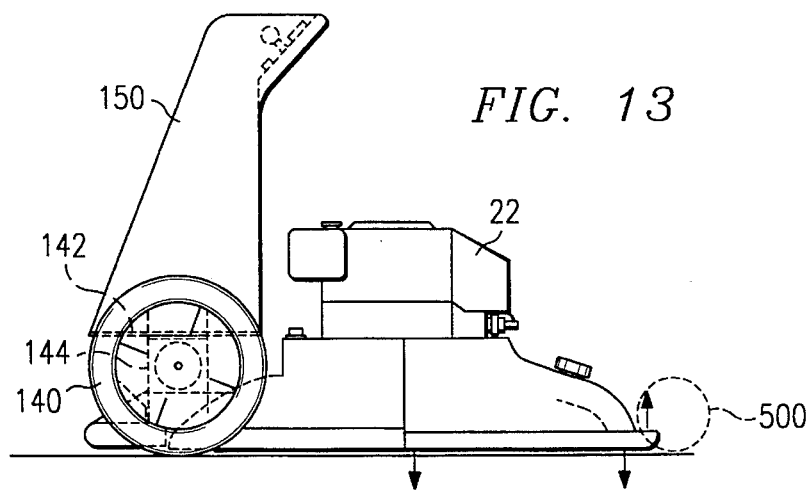
FIG. 13 is a side view of an yet another alternate embodiment of the invention for use as a stand-on air-floated apparatus with front roller support means.

FIG. 13 is a side view of an yet another alternate embodiment of the invention for use as a stand-on or "chariot" type of air-floated apparatus. The chariot includes a rider platform 142 supported on a wheel frame 144. A pair of walls 150 are attached to the platform to form a riding enclosure. As in the tractor-type embodiment, each of the wheels 140 is controlled by a separate motor/joystick control arrangement to facilitate full 360 degree movement of the mower. For example, at the end of a swath, the user can brake one wheel while the other wheel continues to rotate; alternatively, the user can reverse one wheel while the other wheel continues in forward motion. This arrangement provides significant flexibility and operating functionality.

FIG. 1 is a full flotation unit with a vacuum chamber and front and aft shroud.

In FIGS. 1, 42A represents air intake controls to control the flow of air for clean up. Vertical molded extension 30A on the bottom of cutting disc 30 with retractable blades 32 provide for the disturbance of cut grass useful in mulching and the like to soil level.

FIG. 3 set forth an additional form of an injection molded cutting disc, which is also shown in FIGS. 4 and 4A. At the outer edge the rotating disc may have an allen wrench or similar member 230 which, when attached to pin 236, acts as a swivel cutting blade.

The blade 230 is swivel mounted as shown. Raised portions on spinning cutting disc 240 as shown at 234 produce disturbance of cut grass to assist in mulching.

FIG. 4A is a small diameter spinning cutting disc with longer extensions of the cutting disc.

As shown in FIG. 5, vertical molded extension on bottom of grass cutting disk 260 may be provided to produce cut grass disturbance to assist in mulching between blades 32.

A cone-like thermoplastic molded roller 270 of conic section is shown in FIG. 5A. The roller may have tread means 302 or not and may be of various conic sections as shown at 208, 290 and 300.

As shown in FIGS. 6–13, the front end of the apparatus of the present invention may be partially supported by a wheel, roller or ball like member.

One form of such a member is shown in FIG. 5A the end of which are smaller than the central portion, preferably in a cone like or conical section.

Also shown in FIG. 6 is a slide gate 400 to control the slot opening as shown, the sliding gate being controlled for example by frictional engagement with a knurl knob or the like.

Figure 7A:
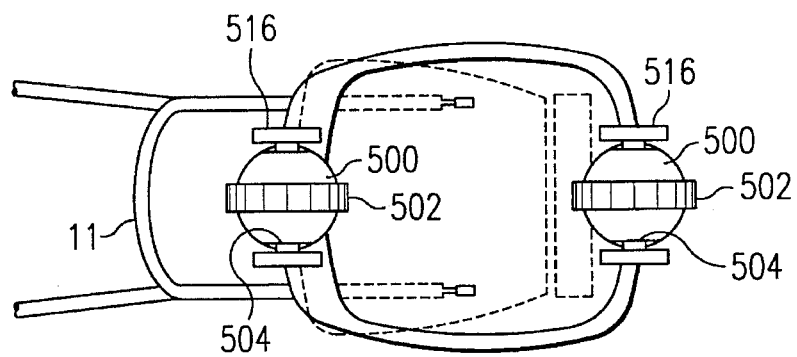
FIG. 7A is a plan view showing the roller balls of the present invention as shown in FIG. 7.

As shown in FIG. 7A in particular one form of the cone section may be that of a ball shaped wheel member 500 with or without tread elements 502, mounted axially with nylon bushings 504.

The apparatus shown in FIG. 7 is a unit with vacuums on top of the impeller 510 with air flow to the vacuum side shown at 508 and pressure flow at 514. Support member 516 provides for adjustment holes 512 for wheel or roller means or bail means 500. Such means of course provide supplemental support for and directional guidance to the unit, particularly in moving the unit to and from storage.

FIG. 8 shows one method of positioning the weight of the power drive over the center line, center of gravity and pivot point of the wheels 91, etc., as well as the use of a front conical-shaped roller or bail means 500.

Similarly, FIG. 9 additionally shows use of a 90° gear box with a flexible coupling 602, the use of front conical-shaped roller means 500. Battery means 600 may be employed, such as 2–12 v deep cycle rechargeable batteries 600 to a 24 v DC motor 604.

FIG. 10 shows a rear view of FIG. 9, particularly showing height adjustment and the battery-motor arrangement.

A further variation of the front conical shaped roller means 500 is shown in plan in FIG. 11 and further indicated in FIGS. 12 and 13.

It is to be particularly noted that the spheroidal, ball form and the conic section-conical rollers have the advantage of low drag resistance when the apparatus is moved laterally in grass, etc.

To expand further on the new, novel and unobvious aspects of these features, attention will now be directed to the grass centrifugal diverter 65a of FIG. 6.

The diverter barrier module FIG. 6, 65a, is attached to the centrifuge shelf. Module 65a, FIG. 6, whereby this module is a diverter module that is semi-cup like as to the side of directional counter like movement of the cutter blade and is injection molded to conform as shown at least 1 predetermined radial area of said centrifugal plate. As a said portion of the tip speed of the cutting means will have a portion of grass clippings centrifuged by tip speed of blade and whereby grass clippings that are not immediately airborne through suction means are centrifuged and conveyed upward to the diverter module or barrier shows 65a and with approximately 15 cup like upward slope # of the diverter towards the clock wise direction of blade, the diverter module automatically diverts and deflects said clippings being conveyed upward and airborne into the vacuum recutting module FIG. 1a to vacuum side of blade flow pattern 54 into pressure side and grass clippings become pressurized in the front shroud such as FIG. 8, 9, 10 and 13 and the dual shroud forward FIG. 1 and 2, shroud 14 forward and aft to soil level for recut and recycle thereof.

The cuttings and material in the flow are deflected by 65a to the air flow, vacuum and then to the recut module as shown in FIG. 1A.

The mulching means as to the teachings of this mulching system projects new and novel energy forces from one source which is the impelling means/impeller that projects forces of pressures and vacuum means that simultaneously that promotes the absolute energies needed to achieve a complete mulching as with pressure means to distribute the fine cut clippings to a predetermined place, as well as simultaneously the use of vacuum means to create airborne clippings to the pressure side of said means of delivery into the outer shroud forward to soil level by pressure means thereto.

The forward mobility by delivering said clippings to a predetermined place of distribution of frontal means that allows clippings to be recut and recycled at an extreme or maximum degree.

With the maximum vacuum means as projected to aft vacuum clean up module that allows for a clean up mode of any clippings on top aft surface.

Not shown is an alternate on outer shroud 39 whereby the outer flange 39a is turned outward on a radius—the alternate being turned on a radius inward allowing pressure to be projected inward under deck housing 15 that would further maximize the stirring up and maximizing pressure inward as well as maximizing force in the inner chamber that would accelerate the recycle and recut action.

As well as a portion of vacuum means by the air intake located aft portion of the clean up vacuum module aft air intake 42A is adjustable for air intake to vacuum side of impeller air intake, in and through that allows for a max. clean up mode of lawn area for recut and recycle.

The spinning disc grass cutting module FIG. 1 has a dual purpose means with the disc portion of said cutting apparatus as to the swivel cutting extension from a structural diameter rim that is slotted to project a non slinging cutting means of rock and debris outwardly as well as severe damage to armature of the cutting blade being the same tensile and conforms to an allen wrench of length as shown into FIGS. 3, 4 and 4A.

The second purpose of method of use as to bottom portion of the cutting means is a support means to the underlying grass and next to soil level but above as to the structural cushion of underlying grass or embodiment. The spinning disc is injection molded, light in wt. of thermo plastic semi glassed filled polymers that projects a V type or extension projecting from bottom surface of disc in both retractable and swivel tensile steeled cutter disc module. This configuration shown in FIG. 1–4A marked 30A in plan view and also shown FIG. 1 on the retractable blade cutting means bottom surface of cutting surface marked 30A.

This slight projection downward of approximately ⅜" with approximately 14–16" diameter at approximately 16,000 S.F.P.M. that allows said extensions downward molded to bottom surface area in a serpentine or straight configuration allows a combing and vibration and agitation of the top surface of cut grass area in combination with air pressure and vacuum means and recut and recycle as to fine cut clippings and for distribution by forward pressure means for clippings to soil level.

An inverted impeller means projecting a vacuum in main deck housing chamber thereto projects by turning over impeller with vacuum side up that allows the pressure side of impeller to produce air pressure in a single deck housing or chamber see FIG. 7 showing a full flotation of the single housing chamber with air pressure projected outward and downward to radius centrifuge shelf for flotation sufficient for flotation. It is particularly important to note that this provides means for centrifuging grass clippings in a single air pressure chamber by cutting tip spell of cutting apparatus and the conveyance thereto on the upper shelf of a semi-radius inward centrifuge shelf to a determined point to and through a delivery port or predetermined point of delivery.

FIG. 5 shows a rotatable cone for support means thereof of a platform such as lawn mower that allows for radius turns of 90°–180° to 360° with turning radius's to a given direction allows for the outer diameter of said ball or cone is from a small outer diameter at axle point with increased diameter such as FIG. 5 and FIG. 7A of the ball type wheel support module as to a grass surface being mowed of approximately 3–4" in height, the turning radius supports the configuration as to a smooth transition such as a swivel wheel as it semi floats and semi ski's in the direction of radius turns and fluid like thereto.

The following features should be noted in connection with FIGS. 8–13.

A term of wheeled air floated apparatus such as shown FIGS. 8–13 is a multiple method of use in combination with both single vacuum or pressure chambers, whereby in a single deck housing configuration such as FIG. 6 whereby FIGS. 8–13 as well as FIG. 6 showing the main deck housing as a vacuum chamber in combination with a wheeled axle attachment aft of engine that location thereof whereby a multiple weight is transferred to some.

FIGS. 8–13 the arrangement maximizes the weight transfer by moving the power train such as electric motor to the approx point of CG point with deep cycle rechargeable batteries, etc. as well as a stand on chariot model or riding lawn mower such as FIG. 13, lawn mowers FIG. 11 and 12 whereby the aft wheel supported platform as to surface area allows for a throttle control as to forward air pressure shown in FIG. 8 #39 termed Forward Flotation Shroud.

By adding said wheel aft as well as the forward wheel has function of directional capabilities from a push type self propelled, chariot or riding whereby the forward air pressure to surface area flotation means and with weight reduction as described projects a throttle control, depth of cut in combination with level adjustment to depth of cut 131 and depth of cut may be shown by digital RPM meter 123 as the aft depth of cut may be a powered vertical mode of operation.

A further multiple method of use is that the weight factor provided by flotation means to surface area and ultimate in mulching as well as the directional forward support wheel that has a fluid like directional means in combination with the aft wheels which can be self propelled, powered or push type with frontal means maintain a ski like motion and maneuverability.

In a further alternative, an air-floated lawn mower may include an endless housing in which a rotary air impeller and a rotary cutting blade are mounted for common rotation by a power source. Power source is operatively mounted on top of housing in a generally central location by conventional fastening means. Power source can be an AC or DC electric motor, or, alternatively, a conventional lawn mower gasoline engine.

A housing is generally trapezoidal in shape and is preferably made of thermoplastic material formed by an injection molding process to provide a lightweight housing. A housing typically has a plurality of air intake openings located in a top part thereof and a substantially open bottom. A handle is pivotally attached to respective opposite sides of housing to allow a user to control movement of the mower. Grass cuttings are discharged from housing through a rearwardly-extending discharge port or duct.

Air impeller is preferably comprised of lightweight thermoplastic material or equivalent, and may be formed by injection molding. Cutting blade is positioned below impeller within housing and the spacing between impeller and blade is adjustable by means of spacers. The vertical position of cutting blade within housing determines the height of the resulting depth of grass cut.

The outer shroud housing has a flared extension having a lower edge. Edge has an outwardly-extending flange as an alternative, the outward bottom of front shroud liner shelf member whereof pressure is diverted below the inner deck shelf. The mower has a substantially endless housing having an open bottom, the air intake openings and the discharge port. In operation, the blade and the impeller are adapted for co-rotation about shaft. Impeller is configured to draw air into housing through air intake openings and expel the air outwardly from impeller along inner surface of the housing.

The inner shroud includes an air entrapment boss integrally formed on or otherwise secured to an outer surface thereof for further sealing against air loss, thus promoting enhanced flotation. In particular, the air entrapment boss provides a secondary lifting action by preventing pressurized air from escaping from underneath the housing.

The centrifuge chamber advantageously transports grass clippings to and through the discharge port or predetermined point of delivery to create a mulch recycle system. The recycling of the grass clippings, which have been cut and centrifuged, to the front of the moving housing enable the cuttings to be recut continuously to create ultra-fine cuttings useful in mulching. Of course, a grass catcher can be affixed to the discharge port and the handle pivoted to enable the mower to be used in the conventional manner.

The system includes an applicator within the conduit for treating the grass clippings with enzymes and/or bacteria to facilitate composting and fermentation. The applicator can be located at any position along the conduit, or at the entrance or exit thereof, for providing the bacterial or enzyme treatment. The applicator preferably provides a liquid application to the stream of clippings to enhance such composting and fermentation. The present invention, however, is construed to cover any type of bacteria/enzyme application at the entry to, the exit of, or within the mulch delivery conduit and by the conveyance of pressure or vacuum means for the conveyance thereof.

In accordance with a further feature of the invention, the mulch recycling system includes means for delivering the grass clippings from the discharge port of the housing to an opposite end of the housing. In this embodiment, the handle of the lawn mower is pivoted over the discharge port. The system includes a conduit having a substantially semi-circular shape adapted to overlay the housing and direct the grass clippings to the opposite end of the housing. The conduit also has a discharge port located at its end which is secured against movement by bracket attached to a support member located on the housing.

As will be apparent to those skilled in the art, the numerous embodiments described above may be advantageously combined in a number of different forms particularly in light of the ability to invert or reverse the impeller at will.

Several types of auxiliary drive mechanisms are also disclosed for the use in facilitating advancement as to the platform housing in a self propelled manner.

By having an aft wheel configuration in combination with air pressure and vacuum means that projects energy forces that promotes a new and novel means of mulching, as well as forward, as well as aft pressure used for either flotation does lighten the weight factor of an apparatus of approximately 20 lbs. which projects less energy forces and power requirements that maximizes.

It should be appreciated by those skilled in the art that the specific embodiments disclosed above may be readily utilized as a basis for modifying or designing other structures for carrying out the same purposes of the present invention. For example, it is envisioned that certain features of the invention, such as the retractable blade mechanism of FIG. 5, are useful in conventional wheeled lawn mowers. Moreover, although the wheeled support assemblies are shown as rear-mounted, they may be forward-mounted with the pressure chamber then located along the rear portion of the housing. It should further be realized by those skilled in the art that such equivalent constructions do not depart from the spirit and scope of the invention as set forth in the appended claims.

What is claimed is:

1. A mulching apparatus, comprising:

a housing substantially endless having an open bottom, having an air moving means located in said housing, said housing having an outer shroud, said housing defining a substantial enclosed cutting chamber, the outer shroud overlaying a predetermined portion of an inner shroud chamber;

a drive motor including rotatable shaft supporting impeller means and cutting means;

mulching means having energy forces and associated with said impeller means for projecting forces of pressure and vacuum that simultaneously promotes energy forces to achieve mulching as well as flotation of said housing above a support surface and in combination with a wheel support whereby air moving means are defined as to pressure and vacuum, whereby said impelling means may be supported in either said inner or outer shroud to function as vacuum means for creating a vacuum within said housing or pressure means for creating a pressure within said housing, and further comprising the air intake as said vacuum means communicating with said impeller means to provide a maximum vacuum force having multiple functions as to provide an aft vacuum module supported along the aft portion of said outer shroud, said module having a vacuum slot, said aft vacuum module being coupled to said vacuum means, for vacuuming/suction of cut grass clippings on surface area of mowed grass and said cut clippings conveyed through a vacuum shroud/chamber in and through said impeller means to the pressure side of said impelling means for recycling and recutting and pressurizing to soil level; and a molded disk module having support means and multiple swivel cutting tensile steel extensions.

2. The mulching apparatus as described in claim 1 comprising:

a housing having an outer air pressure shroud for forward flotation;

an inner chamber comprising said cutting means and said vacuum means in communication with maximum vacuum force as to the aft cleanup of grass clippings, cut clippings being air-borne and vacuumed in and through said impeller means in an inverted operation and said rotatable cutting means being air-borne by the inverted operation, said air-borne clippings are further recut and recycled in and through a mulching module and to the pressure side of said impeller means for delivery of said clipping to soil level and while simultaneously pressurizing air in said chamber having maximum pressure means for forward flotation.

3. The mulching apparatus forward and aft as described in claim 2, comprising:

a housing having an inner cutting vacuum chamber with outer pressure shrouds forward and aft flotation maximum pressures thereof for throttle control for depth of cut.

4. The mulching apparatus as described in claim 1 and further comprising an apparatus having auxiliary drive wheel support of aft portions of weight thereof, and wheel or roller support for secondary support of the frontal portion of the housing and mobile means for storage and secondary support thereof.

5. The mulching apparatus as described in claim 1, comprising a centrifugal means for centrifugally dispersing cut grass clippings to the frontal area of the housing, and a passage thereto to soil level provided, and whereby a diverter module is affixed to the interior of said cutting chamber having an upward semi-cup diverting air-borne means for recur and recycle in and through to the pressure side of said impeller means and delivery of said clippings to soil level.

6. The mulching apparatus as described in claim 1 wherein the aft vacuum clean-up module has at least two air intake control valves, whereby the air intake valves are adjustable to provide a maximum vacuum for said vacuum means for complete cleanup of the top surface of the mowed area, for clippings recut and recycle to and through a frontal pressure shroud attached to the front of the housing.

7. The mulching apparatus as described in claim 1, comprising an adjustable means as to the vacuum slot, adjustment as to the slot opening as well as the control of cleanup to depth of cut for maximum cleanup as to top mowed surface area.

8. The mulching apparatus as described in claim 1 as to the aft vacuum cleanup module having a slot as to the vacuum air intake means and said vacuum module configuration wider than cutting blade or swath thereto.

9. The mulching apparatus as described in claim 1, further comprising a cutting chamber housing as to the energy forces of vacuum and pressure in regards to the inner and outer shroud defining forces thereto and the cutting chamber being the inner shroud means having a bottom opening, a drive motor including a rotatable shaft in combination a with wheel support aft of center line of said housing and with forward flotation of said housing and whereby a multiple of weight transfer of a motor drive to be transferred aft in regards to the axle of said wheel support and center of gravity thereto and whereby a horizontal belt and shiv configuration to provide a vertical rotatable shaft and impeller cutting means supported thereto.

10. The mulching apparatus as described in claim 1, further comprising:

a main deck housing as to the energy forces of vacuum and pressure in regard to the inner and outer shroud defining forces thereto and the cutting chamber being the inner shroud means having a bottom opening; and a drive motor including a rotatable shaft in combination of wheel support of housing and flotation of said housing and with forward flotation of said housing and whereby a multiple of weight transfer of a motor drive to be transferred aft in regards to said weight distributed over said wheel support and whereby a horizontal belt with a 90° right angle drive means with horizontal shaft and flexible coupling means into aft motor drive, said right angle drive to provide a vertical rotatable shaft and support impeller cutting means supported thereto.

11. The mulching apparatus as described in claim 10, further comprising means for maximizing the weight transfer by moving the motor drive aft to center line of aft wheeled axle supported platform as to the surface area, with weight reduction allowing for throttle control, for frontal maximum air pressure delivery level cutting and for depth of cut in combination with vertical adjustment aft thereto in regards to forward flotation.

12. The mulching apparatus as described in claim 11 whereby the wheel support projected aft is reversed, allowing the support wheels to be forward for aft flotation and the weight transfer to center line of wheel support thereto.

13. The mulching apparatus as described in claim 1, further comprising:
   a mulching apparatus with weight transfer on wheel support to produce forward aft flotation with adjustable depth of cut.

14. The mulching apparatus as described in claim 1, including a plurality of wheels for supporting motor weight above the support surface in combination with the air moving means.

15. The mulching apparatus as described in claim 1 further comprising:
   in combination with wheel support of said housing, a substantial endless housing having an open bottom, substantial enclosed chamber adapted to cooperate with a support surface and defining a pressurized cutting chamber having a centrifugal air movement of grass clippings to a predetermined area of said chamber for a mulch recut and recycle of grass clippings to the soil level and air moving means located in said cutting chamber, sufficient to float said housing and said housing having an outer air intake shroud for vacuum air movement in said shroud defining an impeller vacuum chamber;
   vacuum means to the aft vacuum clean up module for vacuuming of grass clippings from a mowed grass surface area for recut and recycle in and through said impeller means to the pressure side of said impeller means;
   air moving means for pressurizing air in said cutting chamber, sufficient to float said housing above the support surface whereby said air moving means is adapted to provide a downward flow of air in said chamber and centrifuge clippings in said chamber to a predetermined area for distribution of said clippings to soil area.

16. The mulching apparatus as described in claim 15, wherein said impeller means and energy forces thereof includes a plurality of rotatable supported wheels.

17. The mulching apparatus as described in claim 16, whereby the mulching means further includes auxiliary drive means for supporting a portion of the housing while the weight over pivot point or axle of a wheel.

18. The mulching apparatus as described in claim 15, wherein the auxiliary drive means is attached to a rear portion of said housing and said vacuum module and includes at least one powered wheel drive means for supporting the wheel on the housing and motor means for rotation of said wheels, in combination with self-propelled motion with handle and fulcrum thereof.

19. The mulching apparatus as described in claim 1, wherein said impeller means may be mounted so as to increase or decrease pressure within a predetermined area of said housing.

20. The mulching apparatus as described in claim 1 having at least one impelling means.

* * * * *